UNITED STATES PATENT OFFICE.

WILHELM HIEMENZ AND LUDWIG TAUB, OF ELBERFELD, GERMANY, ASSIGNORS TO SYNTHETIC PATENTS CO., INC., OF NEW YORK, N. Y., A CORPORATION OF NEW YORK.

SUBSTITUTED BARBITURIC ACIDS.

1,217,447. Specification of Letters Patent. Patented Feb. 27, 1917.

No Drawing. Application filed March 23, 1915. Serial No. 16,422.

*To all whom it may concern:*

Be it known that we, WILHELM HIEMENZ and LUDWIG TAUB, doctors of philosophy, chemists, citizens of the German Empire, residing at Elberfeld, Germany, have invented new and useful Improvements in Substituted Barbituric Acids, of which the following is a specification.

Our invention relates to the manufacture and production of the hitherto unknown substituted barbituric acid derivatives having most probably the formula:

R stands for an alkyl, R' for a hydrocarbon radical and R'' for an alkylene radical e. g. —CH$_2$—, —CH$_2$—CH$_2$—.

The new products have proved to be valuable hypnotics, an average single dose being from ¼ to ½ gram. They are white crystals scarcely soluble in water and forming salts with alkalis.

The process for their production consists

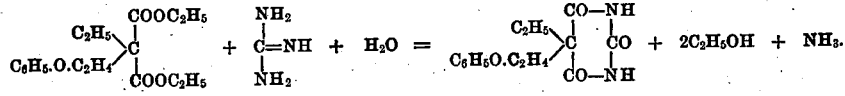

Crystallized from alcohol it forms white crystals melting at 185° C. It is scarcely soluble in water. It possesses the property of forming salts with many metals, e. g. the alkali metals, or calcium, the hydrogen of the NH group being replaced by the metal. It may be either used in the acid or salt form. The sodium salt is a white crystalline powder easily soluble in water. Other malonic esters can be used, for example, the propyl-para-cresoxyethyl-malonic acid ester-giving a C-propyl-C-para-cresoxyethyl barbituric acid (melting point 217° C.), and the benzyl-phenoxyethyl-malonic acid ester giving a C-benzyl-C-phenoxyethyl barbituric acid (melting point 235° C.)

We claim:—

1. The herein described substituted birbituric acids of the following general formula:

wherein R stands for an alkyl, R' for a hydrocarbon radical, and R'' for an alkylene radical, the new substances being white in condensing substituted malonic esters having most probably the formula:

(the R having the above given meaning) with guanidin in the presence of sodium alcoholate, and splitting off the imino group by means of an acid.

In order to illustrate the new process more fully the following example is given, the parts being by weight:—308 parts of ethylphenoxyethylmalonic acid diethyl ester are boiled during eight hours in a vessel provided with a reflux condenser together with a solution of 80 parts of sodium in absolute alcohol and 140 parts of guanidin nitrate. The resulting iminobarbituric acid is then heated during four hours with a 40 per cent. sulfuric acid and the resulting barbituric acid is crystallized from alcohol (80 per cent.). The process proceeds most probably in accordance with the following equation:—

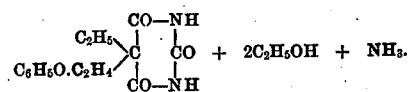

crystals scarcely soluble in water, forming soluble salts with alkalis; and being valuable hypnotics, substantially as described.

2. The herein described substituted barbituric acids of the following general formula:

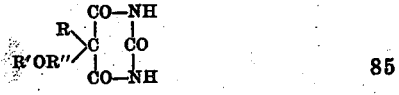

wherein R stands for an alkyl, R' for an aryl and R'' for an alkylene radical, the new substances being white crystals scarcely soluble in water, forming soluble salts with alkalis; and being valuable hypnotics, substantially as described.

3. The herein described substituted barbituric acids of the following general formula:

wherein R stands for an alkyl, R' for an aryl of the benzene series and R'' for an ethylene radical, the new substances being white crystals scarcely soluble in water, forming soluble salts with alkalis; and being valuable hypnotics, substantially as described.

4. The herein described ethylphenoxyethylbarbituric acid of the following general formula:

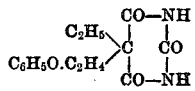

being white crystals melting at 185° C., scarcely soluble in water, forming soluble salts with alkalis, and being a valuable hypnotic, substantially as described.

In testimony whereof we have hereunto set our hands in the presence of two subscribing witnesses.

WILHELM HIEMENZ. [L. S.]
LUDWIG TAUB. [L. S.]

Witnesses:
HELEN NUFER,
ALBERT NUFER.